(12) United States Patent
Huang

(10) Patent No.: US 8,112,856 B2
(45) Date of Patent: Feb. 14, 2012

(54) CLAMP OF ANTI-VIBRATION SPRING

(75) Inventor: Chia Hao Huang, Taiping (TW)

(73) Assignee: Yakita Metal Industry Co., Ltd., Taiping (TW)

( * ) Notice: Subject to any disclaimer, the term of this patent is extended or adjusted under 35 U.S.C. 154(b) by 0 days.

(21) Appl. No.: 12/186,200

(22) Filed: Aug. 5, 2008

(65) Prior Publication Data

US 2010/0283193 A1 Nov. 11, 2010

(51) Int. Cl.
*B23P 19/04* (2006.01)
*B25B 27/26* (2006.01)

(52) U.S. Cl. ............... 29/227; 29/238; 29/239; 29/225; 29/226; 29/228; 29/229; 29/230; 254/10.5; 248/229.12; 248/125.2

(58) Field of Classification Search ............ 248/168, 248/177.1, 295.11, 219.1–219.4, 229.22, 248/218.4, 316.6, 229.24, 229.14, 229.12, 248/316.4, 125.1–125.2, 689, 292.13, 227.3; 267/140.2; 254/10.5; 29/238–239, 225–230; 403/109.1, 118
See application file for complete search history.

(56) References Cited

U.S. PATENT DOCUMENTS

| | | | | |
|---|---|---|---|---|
| 704,884 A * | 7/1902 | Lally | ............................. | 403/169 |
| 4,219,918 A * | 9/1980 | Klann | ............................. | 29/227 |
| 4,527,782 A * | 7/1985 | Klann | ............................. | 267/177 |
| 4,976,416 A * | 12/1990 | Klann | ............................. | 267/177 |
| 5,243,921 A * | 9/1993 | Kruse et al. | ................... | 108/147 |
| 5,634,619 A * | 6/1997 | Alessi | ......................... | 248/219.3 |
| 5,954,314 A * | 9/1999 | Weisshaar | ..................... | 254/10.5 |
| 7,392,969 B2 * | 7/2008 | Chiu et al. | .................... | 248/676 |
| 7,413,150 B1 * | 8/2008 | Hsu | ........................... | 248/123.11 |
| 7,845,601 B1 * | 12/2010 | Culpepper et al. | ......... | 248/125.2 |
| 2003/0098448 A1 * | 5/2003 | Horst | ............................. | 254/10.5 |
| 2006/0242809 A1 * | 11/2006 | Klann | ............................. | 29/227 |

* cited by examiner

*Primary Examiner* — Terrell McKinnon
*Assistant Examiner* — Ingrid M Weinhold
(74) *Attorney, Agent, or Firm* — Wang Law Firm, Inc.; Li K. Wang

(57) ABSTRACT

A clamp of an anti-vibration spring includes a pipe body and a sheathing element fixed to an end the pipe body. Another end of the pipe body is fixed to a covering element. The sheathing element is passed through the external periphery of the pipe body. The pipe body includes a screw rod screwed at the moving element, and an end of the screw rod is protruded from an end of the covering element and fixed at a driving element. A connecting element between the sheathing element and the moving element positions the sheathing element and the moving element. Each sheathing element has a connecting portion including a transversal slot, two clamping disc, and an insert portion on the clamping disc connected to the transversal slot and fixed by a positioning element. By turning the driving element, the anti-vibration spring is compressed or released between the two clamping discs.

8 Claims, 5 Drawing Sheets

CLAMP OF ANTI-VIBRATION SPRING

BACKGROUND OF THE INVENTION

1. Field of the Invention

The present invention relates to a clamp of an anti-vibration spring, and more particularly to a clamp abutted by both ends of an anti-vibration spring for compressing and releasing the spring.

2. Description of the Related Art

With reference to FIG. 5 for a conventional clamp of an anti-vibration spring, the clamp includes a pipe body 9, a moving element 92 disposed in the pipe body 9 and having a screw rod 91 screwed thereon, and two sheathing elements 93 fixed to an external periphery of the pipe body 9, wherein one of the sheathing elements 93 is fixed at a position, and the other is fixed with the moving element 92 and movably connected to the pipe body 9, and each sheathing element 93 is provided for fixing a clamping disc 94, so that a driving element 95 can be turned to move the clamping disc 94 closer or farther for retracting the anti-vibration spring or resuming the anti-vibration spring to its original position respectively.

In FIG. 5, the pipe body 9 is installed at an end of the driving element 95, and a positioning structure 96 is disposed in the pipe body 9 for positioning the screw rod 91. The positioning structure 96 includes a latch ring 961, a bearing 962, a sleeve 963, and a cover 964 covered onto the end of the pipe body 9. In the connection the sheathing element 93 and the clamping disc 94, two sheathing elements 93 with extending portions 931 are concavely and convexly disposed on a side of each sheathing element respectively, and an internal thread portion 932 is formed at the extending portion 931. The clamping disc 94 includes a connecting portion 941 concavely and convexly disposed on a corresponding side of the clamping disc 94 and coupled with the extending portion 931. The connecting portion 941 includes a through hole 942 corresponding to the internal thread portion 932, and each extending portion 931 and each connecting portion 941 are passed through the through hole 942 by an external thread element 97 and secured with the internal thread portion 932 for fixing the extending portion 931 and the connecting portion 941.

In the aforementioned structure, an end of the pipe body 9 is positioned at the screw rod 91, and thus the structure is very complicated and requires more components and longer manufacturing time and procedure. Furthermore, the structure of connecting the sheathing element 93 and the clamping disc 94 is also complicated, and the concave and convex structures of the extending portion 931 and the connecting portion 941 cannot be manufactured easily, and the complicated structure incurs a high assembling cost.

Therefore, it is a key point of the present invention to overcome the foregoing shortcomings of a conventional clamp of an anti-vibration spring by simplifying the structure of the anti-vibration spring clamp and providing an easy assembling procedure.

SUMMARY OF THE INVENTION

It is a primary objective of the present invention to provide a clamp of an anti-vibration spring, and the clamp comes with a simple structure, wherein an end of a pipe body is fixed to a screw rod, and a simple structure is used for connecting a sheathing element and a clamping disc to simplify the components of the clamp of the anti-vibration spring and providing an easy manufacture of the clamp. Compared with the prior art, the assembling procedure of the invention takes less manufacturing time, and the invention reduces the component cost as well as the manufacturing time.

To achieve the foregoing objective, the present invention provides a clamp for an anti-vibration spring comprising:

a hollow pipe body, having a rectangular hole disposed on a circumferential side of the pipe body and parallel to the axial direction of the pipe body;

two sheathing elements, one being fixed at an end of the pipe body, another passing through an external periphery of the pipe body, and each sheathing element having a connecting portion corresponding to another side of the rectangular hole, and each connecting portion having a transversal slot disposed axially with a vertical pipe body, and each sheathing element having a first through hole disposed at the connecting portion and penetrated through the transversal slot;

a moving element, accommodated in the pipe body, and having a first internal screw hole, and a connecting element passing through a rectangular hole of the pipe body and latched with the moving element, and the sheathing element passed through the external periphery of the pipe body being fixed with the connecting element for linking the sheathing element with the moving element;

a screw rod, passed into the pipe body, and screwed into a first internal screw hole of the moving element;

a covering element, fixed to the pipe body that is fixed to another end of the sheathing element, and an end of the screw rod passing out from the covering element, and an end of the pipe body having a plurality of first insert holes penetrating the pipe body, and the covering element having a plurality of second insert holes corresponding to the first insert holes of the pipe body respectively, and each first insert hole and each second insert hole being passed with an insert pin for fixing and positioning the pipe body and the covering element;

a driving element, fixed at an end of the screw rod that is protruded out from an end of the covering element; and two clamping discs, fixed with the corresponding sheathing elements respectively, and a side of each clamping disc having an insert portion to be inserted into each transversal slot, and each insert portion having a first through hole of each the sheathing element and interconnected with the corresponding second through hole, and each first through hole and each second through hole being passed with a positioning element and fixed to each corresponding sheathing element and each corresponding clamping disc, and having a stop portion at each clamping disc for stopping the anti-vibration spring.

DETAILED DESCRIPTION OF THE PREFERRED EMBODIMENTS

Figure 1:
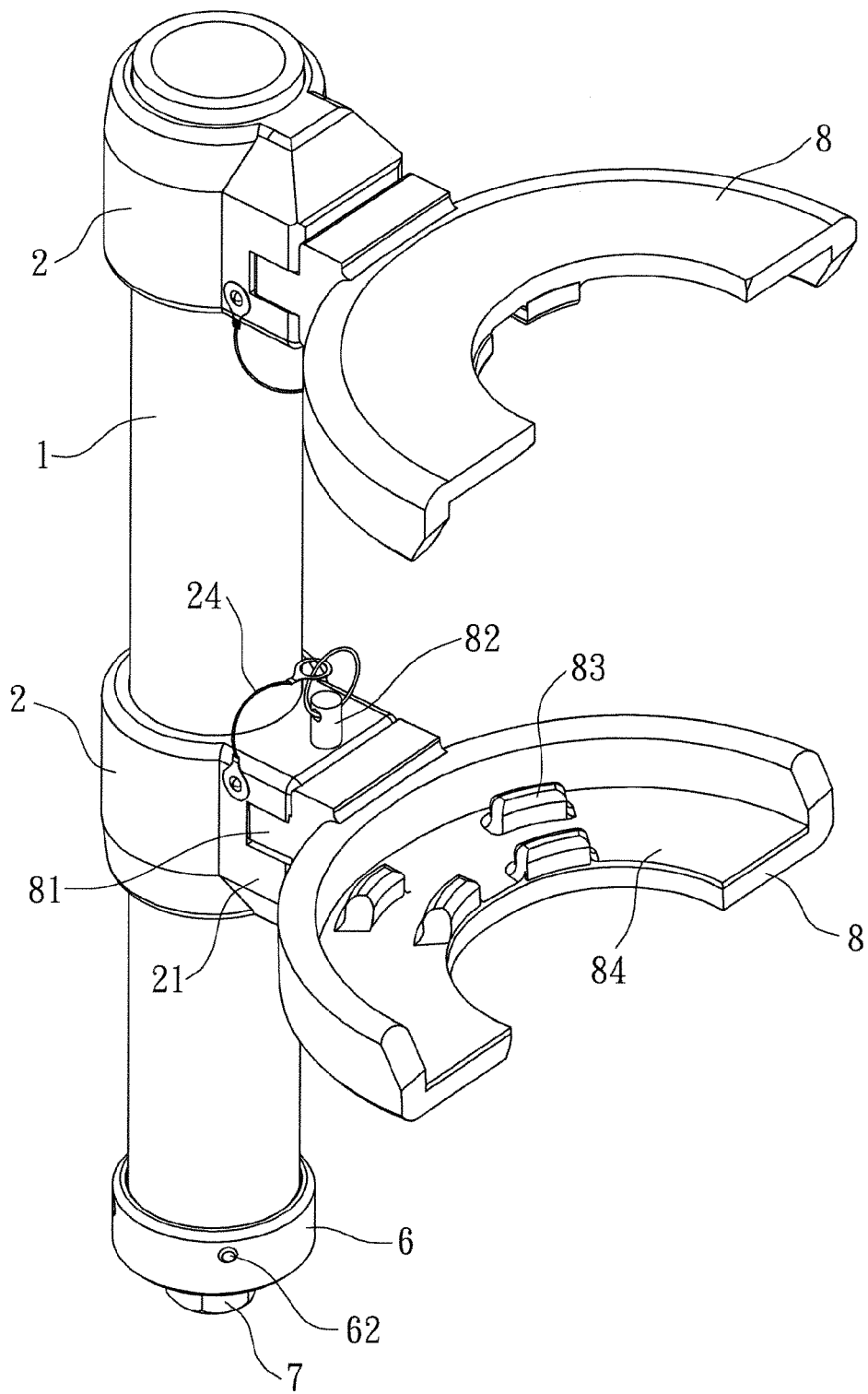
FIG. 1 is a perspective view of a structure of the present invention.
Figure 2:
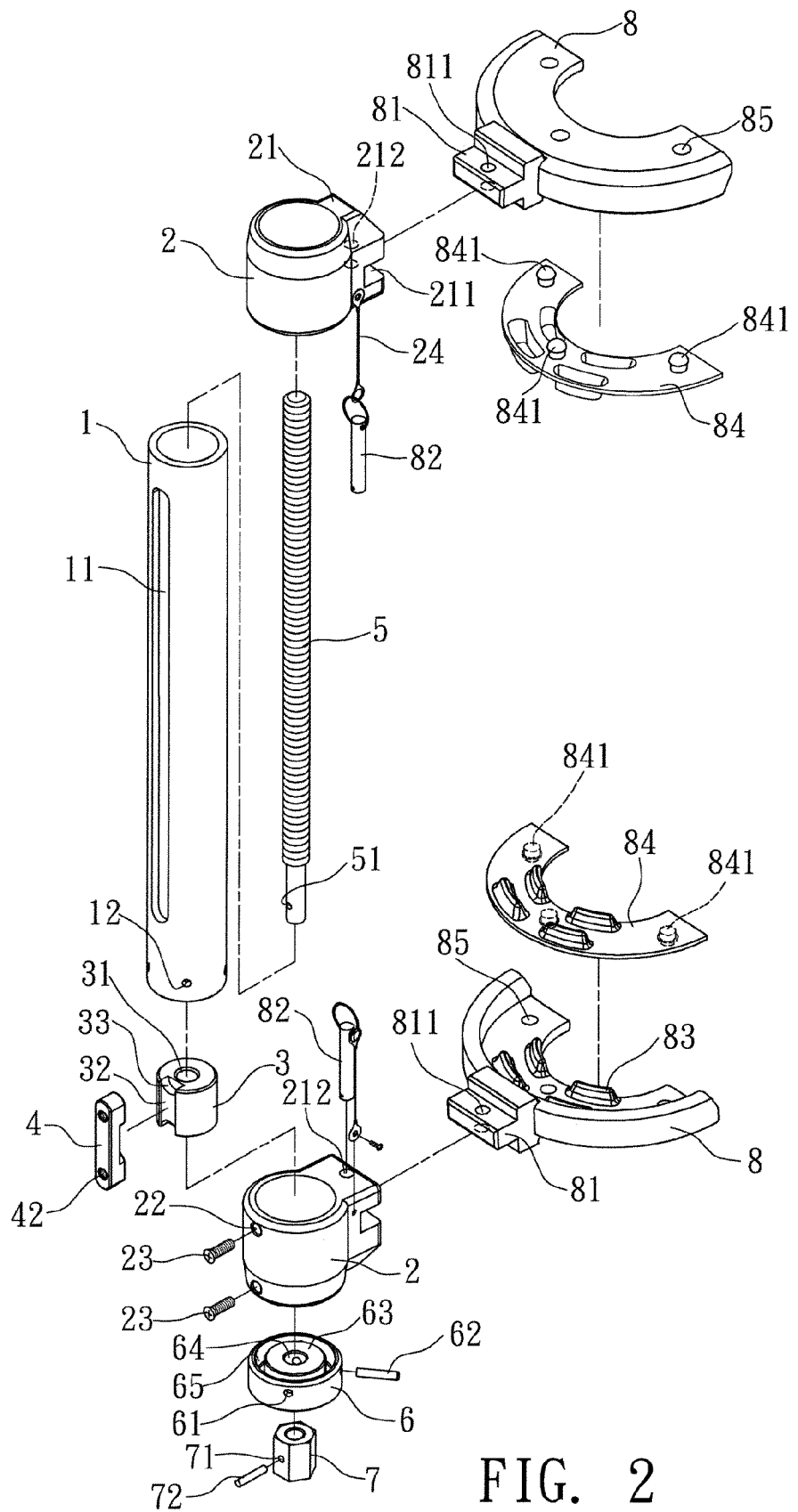
FIG. 2 is an exploded view of a structure of the present invention.
Figure 3:
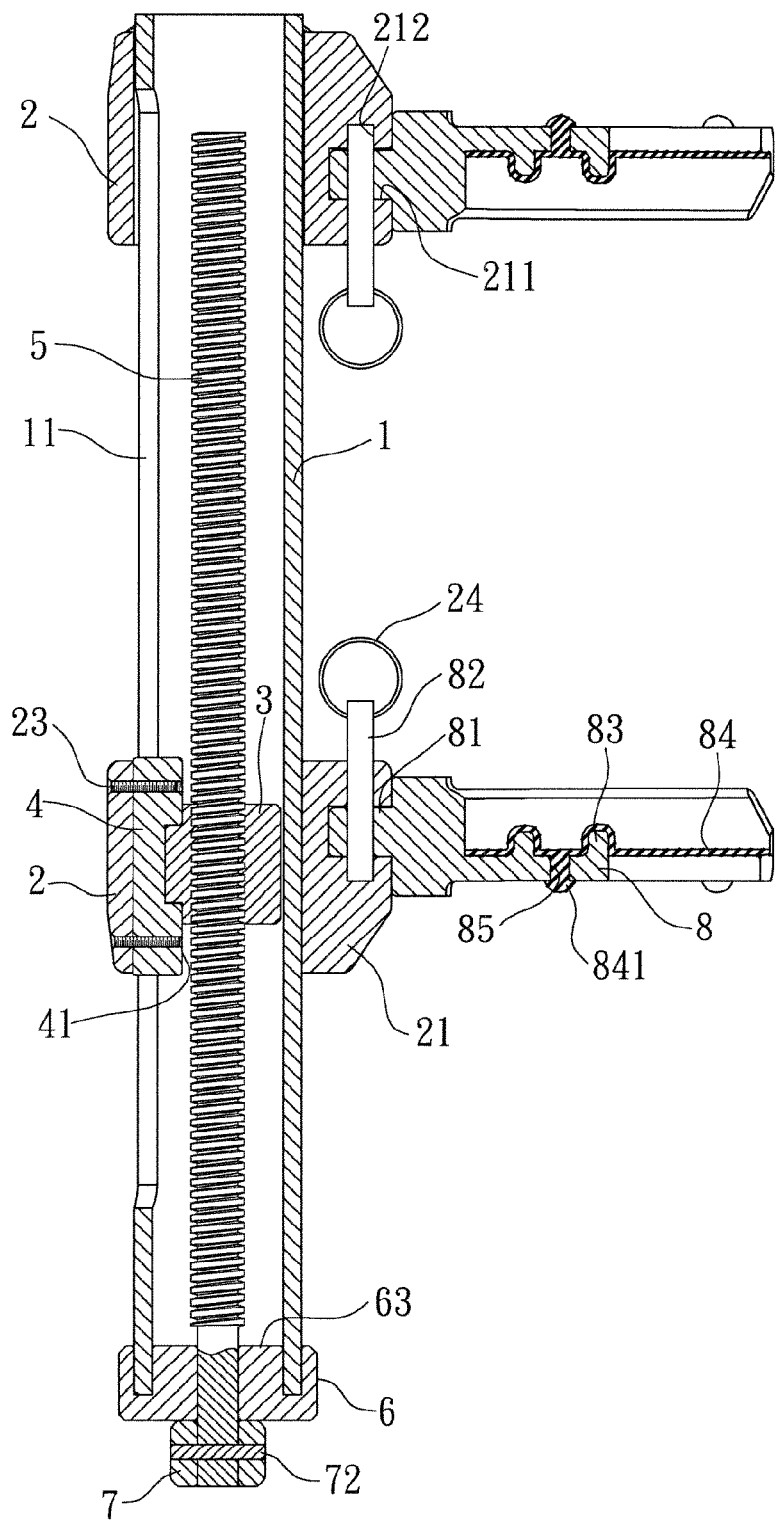
FIG. 3 is a cross-sectional view of a structure of the present invention.
Figure 4:
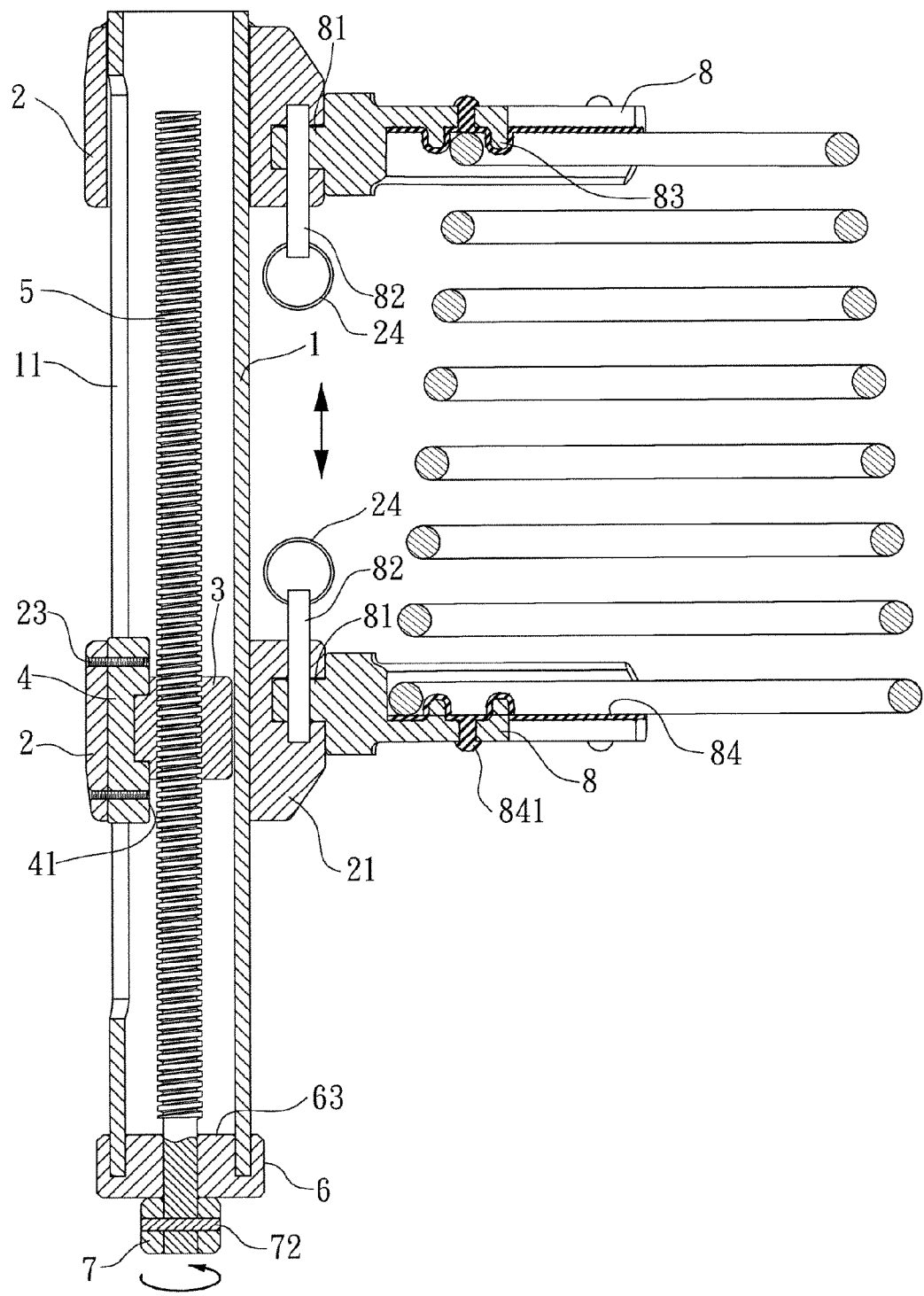
FIG. 4 is a cross-sectional view of an application of the present invention.
Figure 5:
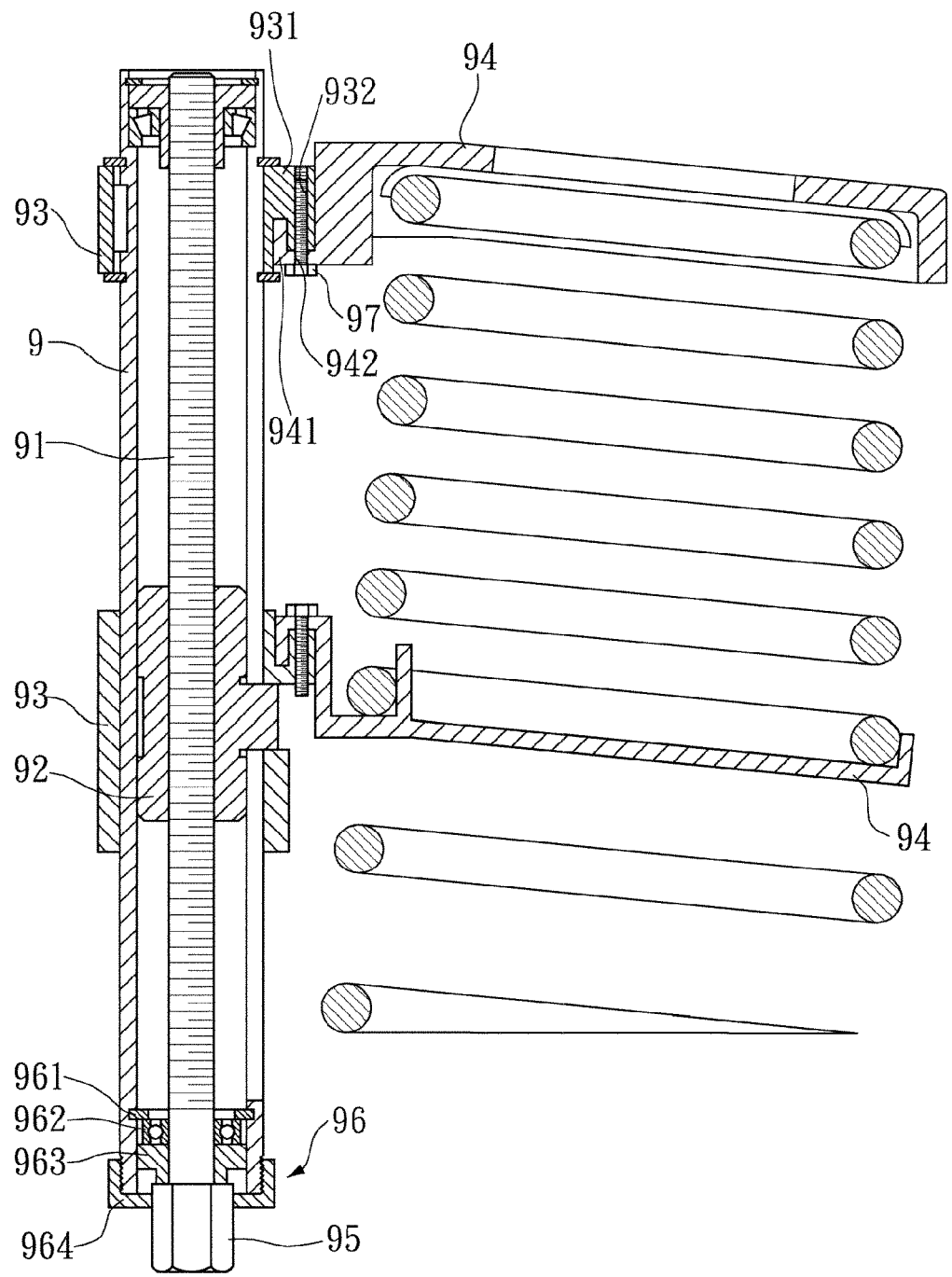
FIG. 5 is a cross-sectional view of a conventional clamp of an anti-vibration spring.

With reference to FIGS. 1 to 4 for a preferred embodiment of the present invention, the preferred embodiment is provided for illustrating the present invention only, but not intended to limit the scope of the present invention.

In this preferred embodiment, a clamp of an anti-vibration spring comprises:

a hollow pipe body 1, having a elongated hole 11 disposed around the pipe body, and the elongated hole 11 being parallel to the axis of the pipe body 1, wherein an end of the pipe body 1 in this preferred embodiment includes a plurality of first insert holes 12 that penetrate the pipe body 1;

two sheathing elements 2, one being fixed to an end of the pipe body 1, another being mounted on the exterior surface of the opposite end of the pipe body 1, and each sheathing element 2 having a connecting portion 21 disposed at a position opposite of the elongated hole 11, and each connecting portion 21 having a transversal slot 211 disposed perpendicularly to the pipe body 1, and each sheathing element 2 having a first through hole 212 at the connecting portion 21 and penetrating through the transversal slot 211, wherein the sheathing element 2 is fixed at an end of the pipe body 1 by soldering in this preferred embodiment;

a moving element 3, accommodated in the pipe body 1, and having a first internal screw hole 31, and a connecting element 4 passing through the elongated hole 11 of the pipe body 1 and latched at the moving element 3, and the sheathing element 2 being fixed to the connecting element 4 to link with the sheathing element 2 and the moving element 3;

a sheathing slot 32, disposed at a side of the elongated hole 11 of the moving element 3 and corresponding to the pipe body 1 in this preferred embodiment, and the moving element 3 having an inwardly concave recession 33 disposed on each of both ends of the sheathing slot 32, and the connecting element 4 being sheathed into the sheathing slot 32 of the moving element 3, and each end of the connecting element 4 having a stop portion 41, and the stop portion 41 being embedded into the inwardly concave recession 33 of the moving element 3, and the stop portions 41 on both ends of the connecting element 4 having a second internal screw hole 42 each corresponding to the moving element 3, and a side of the elongated hole 11 of the sheathing element 2 passing through the periphery of the pipe body 1 having two third through holes 22, and a locking element 23 passing through each third through hole 22 for fixing the second internal screw hole 42 of the connecting element 4;

a screw rod 5, passed into the pipe body 1, and screwed to the first internal screw hole 31 of the moving element 3, wherein a first penetrating hole 51 is formed at an end of the screw rod 5 that is protruded out of the pipe body 1 in accordance with this preferred embodiment;

a covering element 6, fixed to the pipe body 1 that is coupled to an end of the sheathing element 2, and the screw rod 5 being passed out from the covering element 6, and the covering element 6 including a plurality of second insert holes 61 corresponding to each first insert hole 12 of the pipe body 1, and an insert pin 62 passing through each first insert hole 12 and each second insert hole 61 for fixing the pipe body 1 and the covering element 6;

a driving element 7, fixed to an end of the screw rod 5 and protruded from an end of the covering element 6, and the driving element 7 of this preferred embodiment is a hexagonal rotating element, and the covering element 6 having an internal circular wall 63 and a via hole 64 for passing the screw rod 5 out from the pipe body 1, and the driving element 7 being coupled to the screw rod 5, and having a second penetrating hole 71 corresponding to the first penetrating hole 51, and an insert pin 72 being inserted into the first penetrating hole 51 and the second penetrating hole 71 for positioning the driving element 7 at the screw rod 5, and an internal circular groove 65 being formed between the external periphery of the covering element 6 and the internal circular wall 63 for inserting an end of the pipe body 1; and two clamping disc 8, fixed to the sheathing element 2, and each clamping disc 8 having an insert portion 81 on a side for receiving each transversal slot 211, and each insert portion 81 having a second through hole 811 interconnected with a first through hole 212 of each sheathing element 2, and a positioning element 82 being passed through each first through hole 212 and each second through hole 811 for fixing each corresponding sheathing element 2 and clamping disc 8, and having a plurality of stop portions 83 at each clamping disc 8 for stopping the anti-vibration spring, wherein and the positioning element 82 of this preferred embodiment is an insert pin, and each clamping disc 8 includes a cushion 84 stacked on the clamping disc 8 for compressing the anti-vibration spring, and the cushion 84 has a shape corresponding to the clamping disc 8, and at least one through hole 85 (and particularly three through holes 85 in this embodiment) disposed on the clamping disc 8, and the cushion 84 coupled to a corresponding surface of the clamping disc 8 includes a plurality of stop portions 841 corresponding to the quantity of the through holes 85, such that the stop portion 841 passed through the through hole 85 positions the cushion on the clamping disc 8.

In this preferred embodiment, each sheathing element 2 at the connecting portion 21 includes a connecting element 24, and an end of the connecting element 24 is coupled to the connecting portion 21, and another end of the connecting element 24 is coupled to the positioning element 82, for installing the connecting element 24 at a position proximate to the connecting portion 21.

In the foregoing structure, an end of the pipe body 1 is coupled to the covering element 6, and an end of the pipe body is disposed in the internal circular groove 65 between the external periphery of the covering element 6 and the internal circular wall 63, and an insert pin 62 is passed through each first insert hole 12 and each second insert hole 61 for positioning the pipe body 1 and the covering element 6. In addition, the insert portion 81 of the clamping disc 8 is inserted into the transversal slot 212 of the sheathing element 2 between each sheathing element 2 and each clamping disc 8, such that the second through hole 812 of the insert portion 81 and the first through hole 212 are interconnected with each other, and the positioning element 82 such as an insert pin is used for positioning the clamping disc 8 at the sheathing element 2.

In the structure of the invention, the end of the pipe body 1 is coupled to the covering element 6, and the sheathing element 2 is coupled to clamping disc 8, and both are assembled by a simple positioning structure. Unlike the complicated structure of a conventional anti-vibration spring clamp, the present invention provides an easy-to-manufacture assembling component and lowers the manufacturing time and cost.

What is claimed is:

1. A clamp of an anti-vibration spring, comprising:
a hollow pipe body with a first end, a second end, a length, and an axis along the length, having an elongated hole disposed on the hollow pipe body and parallel to the axis of the hollow pipe body;
a first sheathing element and a second sheathing element, the first sheathing element being fixed at the first end of the hollow pipe body, the second sheathing element being mounted movably on the hollow pipe body, and each sheathing element having a connecting portion disposed at a position opposite of the elongated hole, and each connecting portion having a transversal slot disposed perpendicularly to the axis of the hollow pipe body, and each sheathing element having a first through hole disposed at the connecting portion and penetrated through the transversal slot;

a moving element, accommodated inside the hollow pipe body, having a first internal screw hole and a connecting element passing through the elongated hole of the hollow pipe body, the connecting element being latched to the moving element, the second sheathing element sliding outside of the hollow pipe body and being fixed with the connecting element for linking the second sheathing element with the moving element;

a screw rod passing into the hollow pipe body and screwing into the first internal screw hole of the moving element;

a covering element, fixed at the second end of the hollow pipe body, an end of the screw rod passing through the covering element, and the second end of the hollow pipe body having a plurality of first insert holes, and the covering element having a plurality of second insert holes, each first insert hole aligning with one second insert hole and being secured with an insert pin for positioning the pipe body to the covering element;

a driving element, fixed at the end of the screw rod that passes through the covering element;

a first clamping disk mounted on the first sheathing element and a second clamping disk mounted on the second sheathing element, and each clamping disc having an insert portion to be inserted into each transversal slot of the sheathing elements, and each insert portion having a second through hole interconnected with the first through hole of each sheathing element, and each first through hole and each second through hole being secured with a positioning element and fixed to each corresponding sheathing element and each corresponding clamping disc respectively, and having a stop portion at each clamping disc for stopping the anti-vibration spring;

wherein the moving element includes a sheathing slot disposed at a position corresponding to a side of the elongated hole of the pipe body, and the moving element having inwardly concave recessions disposed on first and second ends of the sheathing slot, and the connecting element being sheathed to the sheathing slot of the moving element, and first and second ends of the connecting element having a stop portion embedded into the inwardly concave recessions of the moving element, and the stop portions on the first and second ends of the connecting element having a second internal screw hole corresponding to the moving element, and the second sheathing element having two third through holes on a side of the elongated hole at an external periphery of the pipe body, and a locking element passing through each third through hole and securing the second internal screw hole of the connecting element.

2. The clamp of an anti-vibration spring as recited in claim 1, wherein the covering element includes a via hole through which the screw rod passes through, and the screw rod includes a first penetrating hole, and the driving element includes a second penetrating hole, and an insert pin is inserted into the first penetrating hole and second penetrating hole for positioning the driving element on the screw rod.

3. The clamp of an anti-vibration spring as recited in claim 2, wherein the covering element includes an internal circular wall and an external circular periphery, and the via hole is passed through the internal circular wall, and the covering element forms an internal circular groove between the external circular periphery and the internal circular wall for inserting an end of the pipe body.

4. The clamp of an anti-vibration spring as recited in claim 1, wherein each clamping disc is stacked with a cushion for compressing the anti-vibration spring, and the cushion has a shape corresponding to the clamping disc, and the clamping disc includes at least one fourth through hole, and a stop portion is disposed on a surface of the cushion corresponding to the fourth through hole on the clamping discs, where the cushion is coupled to the clamping disc and with a quantity of stop portions corresponding to the quantity of fourth through holes, such that the cushion is positioned on the clamping disc by passing the stop portion through the fourth through hole.

5. The clamp of an anti-vibration spring as recited in claim 1, wherein each sheathing element includes a connecting member with a first end and a second end, the first end of the connecting member coupled to the connecting portion, and the second end of the connecting member coupled to the positioning element.

6. The clamp of an anti-vibration spring as recited in claim 1, wherein the first sheathing element fixed at the first end of the pipe body is soldered onto the pipe body.

7. The clamp of an anti-vibration spring as recited in claim 1, wherein the positioning element is an insert pin.

8. The clamp of an anti-vibration spring as recited in claim 1, wherein the driving element is a rotating element with an external hexagonal structure.

* * * * *